United States Patent
Picha et al.

[11] Patent Number: 6,081,719
[45] Date of Patent: Jun. 27, 2000

[54] LAYERED WIRELESS COMMUNICATION SYSTEM AND METHOD

[75] Inventors: Dean M. Picha, Buffalo Grove; Dennis W. Gilliland, Bartlett; David J. Bielat, Algonquin, all of Ill.

[73] Assignee: Motorola, Inc., Schaumburg, Ill.

[21] Appl. No.: 09/136,238

[22] Filed: Aug. 19, 1998

[51] Int. Cl.[7] .................................................. H04B 7/26
[52] U.S. Cl. .......................................... 455/449; 455/459
[58] Field of Search .................................... 455/444, 448, 455/449, 456, 445, 458, 434, 453

[56] References Cited

U.S. PATENT DOCUMENTS

| | | | |
|---|---|---|---|
| 5,392,453 | 2/1995 | Gudmundson et al. | 455/444 |
| 5,513,380 | 4/1996 | Ivanov et al. | 455/448 |
| 5,857,154 | 1/1999 | Labord et al. | 455/444 |
| 5,875,399 | 2/1999 | Kallin et al. | 455/434 |
| 5,903,840 | 5/1999 | Bertacchi | 455/444 |
| 5,913,167 | 6/1999 | Bonta et al. | 455/453 |
| 5,913,168 | 6/1999 | Moreau et al. | 455/444 |
| 5,924,040 | 7/1999 | Trompower | 455/456 |
| 5,937,353 | 8/1999 | Fapojuwo | 455/453 |

*Primary Examiner*—Salvatore Cangialosi
*Attorney, Agent, or Firm*—Kenneth A. Haas; Sayed Hossain Beladi

[57] ABSTRACT

A layered wireless communication system (100) uses "coverage zones, i.e., coverage cells (102–108) and traffic zones," i.e., traffic cells (110–122). The traffic cells (110–122) do not require a broadcast channel carrier. In accordance with the present invention, when a call request is received (202) within one of coverage cells (102–108), either originated by a mobile or terminating with a mobile, a determination is made (208) as to whether the call can be handled by one of the traffic channel carriers within a traffic cell (110–122). If the call can be served by one of these traffic channel carriers, an assignment of the particular traffic channel carrier to service the call is made (214). Otherwise, the call is assigned a traffic channel carrier assigned to one of coverage cells (102–108).

9 Claims, 2 Drawing Sheets

6,081,719

LAYERED WIRELESS COMMUNICATION SYSTEM AND METHOD

CROSS-REFERENCE TO RELATED APPLICATIONS

The present application is related to commonly assigned U.S. patent application Ser. No. 09/136,236 filed Aug. 19, 1998 entitled "Wireless Communication System and Method of Assigning Communication Resources" now abandoned, the disclosure of which is hereby expressly incorporated herein by reference.

FIELD OF THE INVENTION

The present invention relates generally to wireless communication systems, and more particularly, to a layered wireless communication system and a method of operating a layered wireless communication system.

BACKGROUND OF THE INVENTION

Wireless communication systems, for example, cellular radiotelephone systems, are well known. These systems provide communication services utilizing radio frequency transmission techniques between land based radio transceiver stations, or base stations, and mobile radio transceivers, or mobiles. Each of the base stations and the mobiles thus include a radio transceiver for communicating voice, data, or other information utilizing a communication resource, i.e., a radio link, and a standard communication protocol. For example, several such protocols for cellular radiotelephony are the Narrowband Advanced Mobile Phone System (NAMPS), the Advanced Mobile Phone System (AMPS), the Global System for Mobile Communications (GSM), the Personal Communication System (PCS), the United States Digital Cellular (USDC), or the Code Division Multiple Access (CDMA) protocols.

A common feature of these wireless communication systems is that a large geographic area is divided into smaller areas ("cells"), which are serviced by a base station. The use of cells to subdivide the large geographic area permits enhanced geographic coverage with efficient use of radio frequency resources. For example, radio frequency resources assigned to one cell may be reused in cells located a sufficient distance from this cell without the resources interfering. During the design and implementation of a cellular communication system, careful planning is undertaken to assign communication resources to cells to ensure sufficient capacity, i.e., to assign a sufficient number of resources to handle the anticipated number of calls at a given time within the cell, and to ensure that communication resources assigned to one cell do not cause unacceptable levels of interference in adjacent or neighboring cells.

The ever increasing popularity of cellular systems with their users has created a need to increase system capacity. An advantage of the cellular system in providing greater capacity is that cell sizes may be reduced, by limiting the transmission power of the base stations and mobiles, permitting increased reuse of communication resources. Greater reuse of communication resources in a given geographic area equates to increased capacity.

One type of cellular system utilizing particularly small cell sizes is referred to as a "picocellular" system including very small geographic sized "picocells." Picocellular systems find particularly advantageous use as in-building cellular radiotelephone systems. Implementing wireless communications systems within a building poses numerous problems because of the building topology. The picocellular systems require a high degree of optimization to successfully interact with the surrounding "macrocellular" environment, as well as to provide the highest quality of service to the in-building users. Perhaps the largest optimization effort is due to the installation of the many required base stations, one each for each picocell. Each picocell requires assignment of a broadcast carrier including a broadcast control channel for supplying "coverage" in the picocell, and the assignment of traffic carriers for handling the call traffic within the cells. The broadcast control channel is utilized by the base station and the mobiles to request and establish service, i.e., to make and complete calls. Once service is established, the mobile is assigned a traffic channel resource on which the call is conducted.

The broadcast control channel is referred to as a dedicated channel. That is, its signal characteristics, e.g., carrier, transmission power, timing, etc., are necessarily fixed. However, fixing certain characteristics of the broadcast control channel, i.e., its carrier and power, limit the potential for reusing this carrier within the cellular communication system. For example, it is known to use frequency hopping techniques in order to provide statistically enhanced carrier reuse. However, with the broadcast carriers fixed for each cell, these carriers are typically unavailable for reuse in the frequency hopping plan. In addition, the transmit power of the broadcast control channel requires substantial geographic spacing of cells reusing the associated broadcast carrier thus exacerbating the optimization problem particularly in the picocellular environment.

Thus there is a need for a wireless communication system overcoming the reuse limitations associated with broadcast control channels and associated broadcast carriers and thus providing increased capacity and more efficient resource utilization.

DETAILED DESCRIPTION OF THE PREFERRED EMBODIMENTS

The present invention is described in terms of several preferred embodiments directed to layered cellular communication systems. Such systems include in-building picocellular environments as well as a microcell/macrocell environments. It will be appreciated that the present invention will have application apart from the preferred embodiments described herein, and the description is provided merely to illustrate and describe the present invention and it should in no way be taken as limiting of the present invention.

Figure 1:
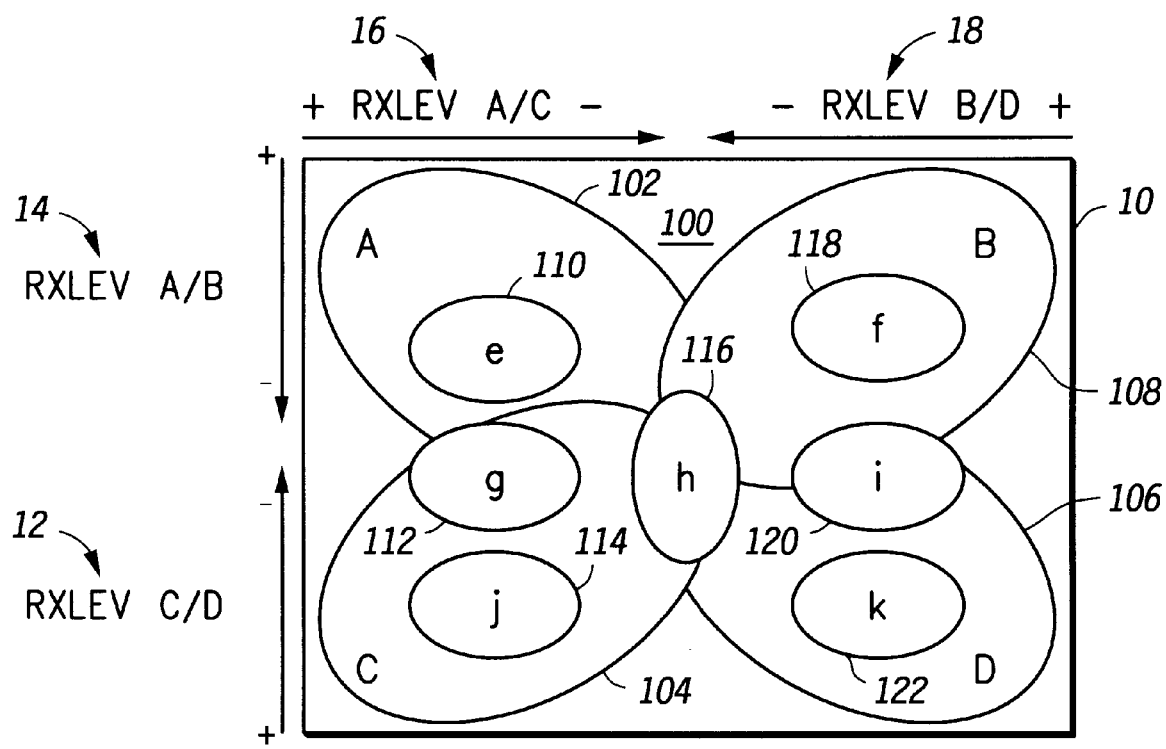
FIG. 1 is a diagram illustrating a layered wireless communication system in accordance with a preferred embodiment of the present invention.

Referring to FIG. 1, wireless communication services are provided in a geographic area 10, utilizing a plurality of cells. The geographic area is preferably an interior and immediate surrounding portions of a building, an area of a city or town, an airport, or any geographic area over which wireless communication services are desired. Coverage of area 10 is provided by a layered wireless communication system 100 including a plurality of coverage cells, individually cell 102, cell 104, cell 106 and cell 108. The primary purpose of coverage cells 102 108 is to provide coverage and not to provide the required system capacity. Additional "traffic zones" defined by a plurality of traffic cells, individually cell 110, cell 112, cell 114, cell 116 cell 118, cell 120 and cell 122, are distributed through area 10 and to provide capacity. In accordance with the present invention, and as will be described, cells 110–122 also allow enhanced reuse of communication resources. It should be noted from the outset that communication resource and communication channel are used to refer to a physical link between the base station and the mobile. For example, in a time division multiplexed (TDM) system such as GSM or USDC, a communication channel is one of a number of time slots on a particular carrier. In a code division multiplexed (CDM) system such as PCS or CDMA, a communication channel is a spreading code on a particular carrier. For the TDM system, therefore, the broadcast control channel is a fixed time slot on a fixed carrier within a cell. A traffic channel is one of a plurality of time slots available on the one or more traffic channel carriers assigned to a cell and the otherwise available time slots on, for example, the broadcast carrier.

Cells 102–108 are arranged to operate at substantially higher power than cells 110–122, and accordingly, the size of each of cells 102–108 is larger than the size of each of cells 110–122. As will be described more fully below, each of cells 102–108 include a broadcast carrier on which a broadcast control channel is transmitted. Cells 110–122 include only traffic channel carriers and, in accordance with the preferred embodiments of the present invention, do not include a broadcast carrier or broadcast control channel. As further used herein, cells 102–108 define an upper layer while cells 110–122 define a lower layer of wireless communication system 100. Moreover, and as can be seen in FIG. 1, traffic cells 110–122 are disposed over one or more of coverage cells 102–108. For example, traffic cell 112 covers portions of both coverage cell 102 and coverage cell 104. Traffic cell 116 covers portions of coverage cells 102–108. Thus, traffic channel resources are made available in multiple coverage cells.

It will be appreciated that each of cells 102–122 include a suitable base station or base station system at least having a radio frequency transmitter and receiver, an antenna structure and any required control elements as is well known in the art. Furthermore, the respective base stations may be coupled to a base station controller or similar device but are at least coupled to a mobile switching center, which provides further control of the operation of the respective base stations for assigning communication resources. Additionally, it will be appreciated that one or more mobile radiotelephones ("mobile") operates within area 10, and particularly, within the coverage area of one or more of cells 102 122. That is, a mobile located within cell 110 in the lower layer is further within the coverage area of cell 102 in the upper layer.

Figure 2:
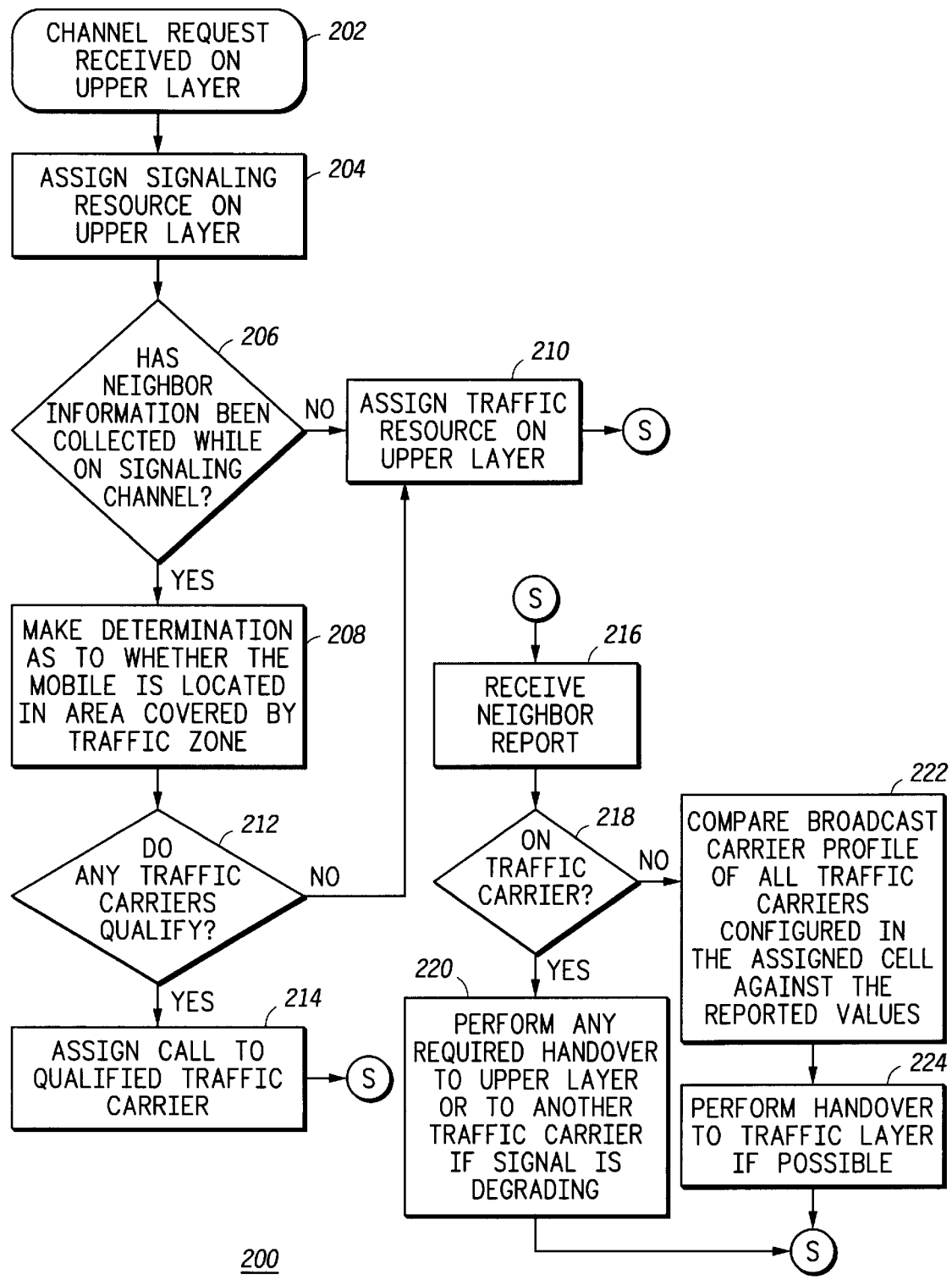
FIG. 2 is a flow chart illustrating a method of assigning a communication resource in accordance with a preferred embodiment of the present invention.

With reference to FIG. 2, assignment of communication resources is made in accordance with a preferred method 200. At step 202, a request for a communication resource, a "channel request" is received on the upper layer, i.e., is received within one of cells 102–108. At step 204 a signaling channel resource is assigned from the respective cell 102–108 for communicating signaling and control information with the requesting mobile. While on the signaling channel, the mobile begins a process of collecting neighbor cell information. The mobile collects neighbor cell information by "listening" to each of the broadcast control channels of cells 102–108 and recording at least signal strength information for each. If the neighbor cell information is available, step 206, this information is used to make a determination as to whether the mobile is located within an area covered by one of the "traffic zones," i.e., is the area covered by one of cells 110–122, step 208. Otherwise, at step 210, a traffic resource is assigned on the upper layer, i.e., from the one of cells 102–108.

Returning to step 208, it is required that a mobile location device be used to identify the position of the mobile in order to determine whether the mobile is within a particular traffic zone. The determination does not have to be exact, since procedures may be put into place to recover from a traffic channel resource assignment failure resulting from a bad determination. Failures in this situation are not critical because the traffic channel assignment to a traffic zone is only being made for traffic capacity management purposes, and assignment failures will not result in a loss of service. If a traffic channel assignment to a traffic zone fails, assignment to an upper layer traffic channel resource may be made to provide service.

It should be understood that virtually any location device and/or location method may be used for determining the location of a mobile within a traffic zone may be utilized without departing from the fair scope of the present invention. In a preferred embodiment of the present invention, neighbor information, i.e., the signal strength of each of the broadcast carriers in cells 102–108 as measured by the mobile and a location matrix are used. The signal strength of the broadcast carrier becomes weaker, illustrated for example by arrows 12, 14, 16 and 18 in FIG. 1, as the distance from the radiation point increases. Referring again to FIG. 1, for different points within area 10, a different profile with respect to each of the broadcast carriers is measured and retained in a database structure within the entity providing control of the base stations, either the base station controller or the mobile switching center. Observing the profile provides a rough determination of where within area 10 the mobile is presently located. By also knowing the transmit power of each traffic channel carrier, along with the loss characteristics of the environment, the location matrix is constructed indicating an upper service bound and a lower service bound of each broadcast carrier with respect a specific traffic channel carrier. The location matrix may further be derived automatically by communication system 100. As described, recovery mechanisms are provided to recover from a bad assignment decision, and without loss of service.

Additionally, the location matrix is utilized to provide traffic zone to traffic zone handoff where a matching profile from a another zone is found based on the neighbor information reported from the mobile.

At step 212, if the mobile is not within a traffic zone, i.e., not within one of cells 110–122, then a traffic channel resource on the upper level is assigned, step 210. If the mobile is within a traffic zone, step 212, the call request is assigned to one of the traffic channel resources assigned to the traffic zone, step 214.

After either of step 210 or step 214, the mobile has an assigned traffic channel, either on the upper layer or on the lower layer. The mobile continues to gather neighbor information, and at step 216, a report of the neighbor information is received from the mobile by the control entity. With the mobile already assigned a traffic zone traffic channel resource, step 218, if the signal is degrading a handoff is required either to an upper layer traffic channel resource or to another traffic channel resource from another traffic zone, step 220. Suitable handoff traffic zones may be found based upon the above-described location matrix and the neighbor information. Moreover, absent reliable neighbor information, the ability to handoff from the lower layer to the upper layer prevents a loss of service due to a handoff failure.

The profiles of each of the broadcast carriers are compared with mobile reported values. Using the location matrix, a potential handoff traffic zone is identified, and a handover of the mobile to the traffic zone is completed, step 224. In this manner, mobiles are continuously and preferentially moved from the upper level to the lower level, i.e., from the broadcast coverage areas to the traffic zones, and a further moved from traffic zone to traffic zone.

In accordance with the present invention, each of the traffic zones do not include a broadcast carrier thus freeing communication resources for traffic channel usage and simplifying reuse plans. Moreover, mobiles are preferentially moved from the broadcast coverage areas to traffic zones. This reduces the number of traffic channel resources assigned to the broadcast coverage areas. Because the traffic zones have significantly lower transmission power, traffic channel resources may be freely assigned and reused in the traffic zones. In this regard, a group of traffic channel resources may be pooled for use by the traffic zones with a relatively small number of available resources assigned for use in the broadcast coverage areas. Overall, the number of communication resources used as broadcast carriers, and thus unavailable for frequency hopping and/or traffic channel usage, is significantly reduced. Moreover, substantial reuse of traffic channel resources is possible within the traffic zones.

More particularly, the present invention provides for the assignment of the same physical carrier, i.e., the same radio frequency, to multiple cells in the system without causing interference. The present invention uses "traffic zones," namely cells 110–122, to eliminate the requirement for a broadcast carrier within these cells. In accordance with the present invention, when a call request is received within one of cells 102–108, either originated by a mobile or terminating with a mobile, a determination is made as to whether the call can be handled by one of the traffic channel carriers from any of cells 110–122. If the call can be served by one of these traffic channel carriers, an assignment of the particular traffic channel carrier to service the call is made. Otherwise, the call is assigned a traffic channel carrier assigned to one of cells 102–108.

Many additional changes and modifications could be made to the invention without departing from the fair scope and spirit thereof. The scope of some changes is discussed above. The scope of others will become apparent from the appended claims.

We claim:

1. A layered wireless communication system comprising:
    a plurality of coverage cells, each coverage cell including a broadcast channel for directing traffic channels assignment in a plurality of traffic cells
    wherein each traffic cell having only traffic channels and excluding broadcast channels, the plurality of traffic cells overlapping the plurality of coverage cells and at least one of the plurality of traffic cells overlapping at least two of the plurality of coverage cells, and whereby a call request is received by one of the plurality of coverage cells via an associated broadcast channel which directs a traffic channel assignment selected from one of the plurality of traffic cells when a mobile is located within one of the plurality of traffic cells.

2. The layered wireless communication system of claim 1 wherein the traffic channel is assigned from one of the plurality of coverage cells when the mobile is not located within one of the traffic cells.

3. The layered wireless communication system of claim 1, the traffic channel selected from a plurality of traffic channel resources.

4. The layered wireless communication system of claim 3, a traffic carrier is simultaneously used in a first of the plurality of coverage cells and a second of the plurality of coverage cells.

5. The layered wireless communication system of claim 1, comprising a mobile location device arranged to detect a location of a mobile within the layered wireless communication system and with respect to the plurality of coverage cells and the plurality of traffic cells.

6. The layered wireless communication system of claim 1, the location device comprising:
    a location matrix, the location matrix providing an upper service bound and a lower service bound of a coverage cell relative to each traffic cell.

7. The layered wireless communication system of claim 1, each of the plurality of coverage cells having a coverage cell transmission power and each of the plurality of traffic cells having a traffic cell transmission power, each coverage cell transmission power exceeding each traffic cell transmission power.

8. The layered wireless communication system of claim 1, each of the plurality of coverage cells having a coverage cell area, and each of the plurality of traffic cells having a traffic cell area, each coverage cell area being greater than each traffic cell area.

9. The layered wireless communication system of claim 8, comprising an aggregate coverage area including the coverage cell area of each of the plurality of coverage cells.

* * * * *